(No Model.) 4 Sheets—Sheet 2.
J. W. FLAGG & C. R. B. CLAFLIN, Jr.
CASH CARRIER.
No. 360,008. Patented Mar. 29, 1887.
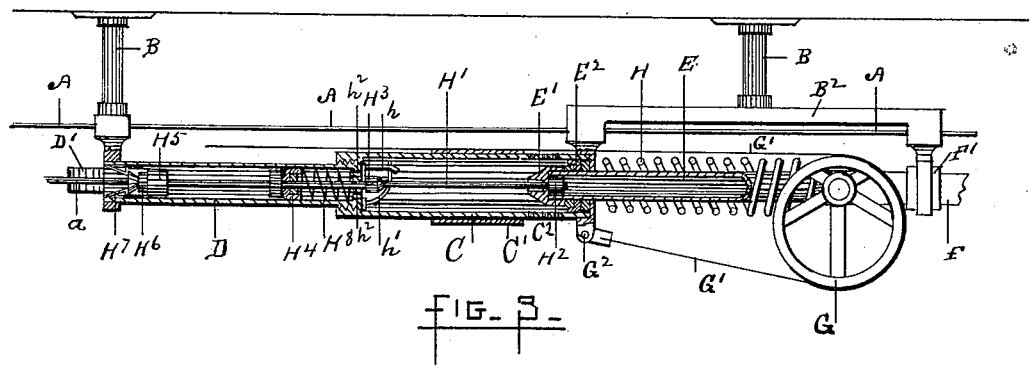
FIG. 3.
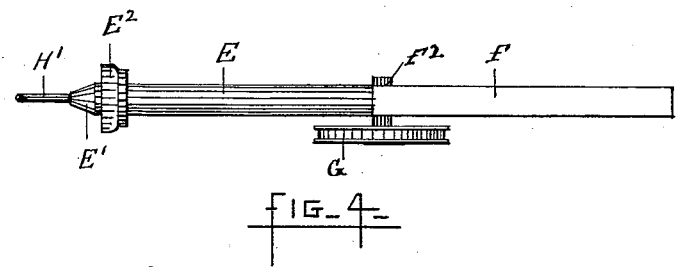
FIG. 4.
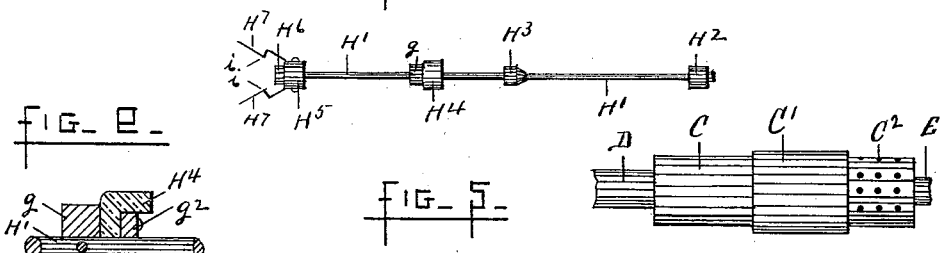
FIG. 5.
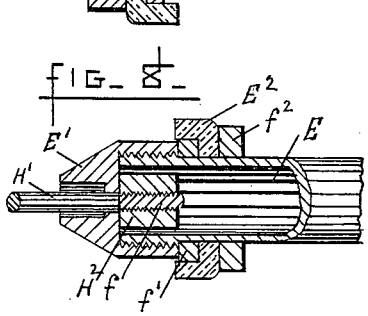
FIG. 2.
FIG. 8.
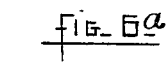
FIG. 6a.
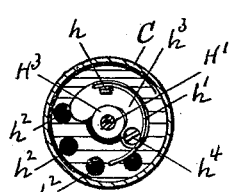
FIG. 6.
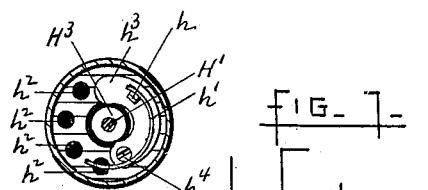
FIG. 7.
Witnesses—
Rufus B. Fowler
H. M. Fowler
Inventors—
Joseph Watter Flagg
C. R. B. Claflin Jr.
N. PETERS, Photo-Lithographer, Washington, D. C.

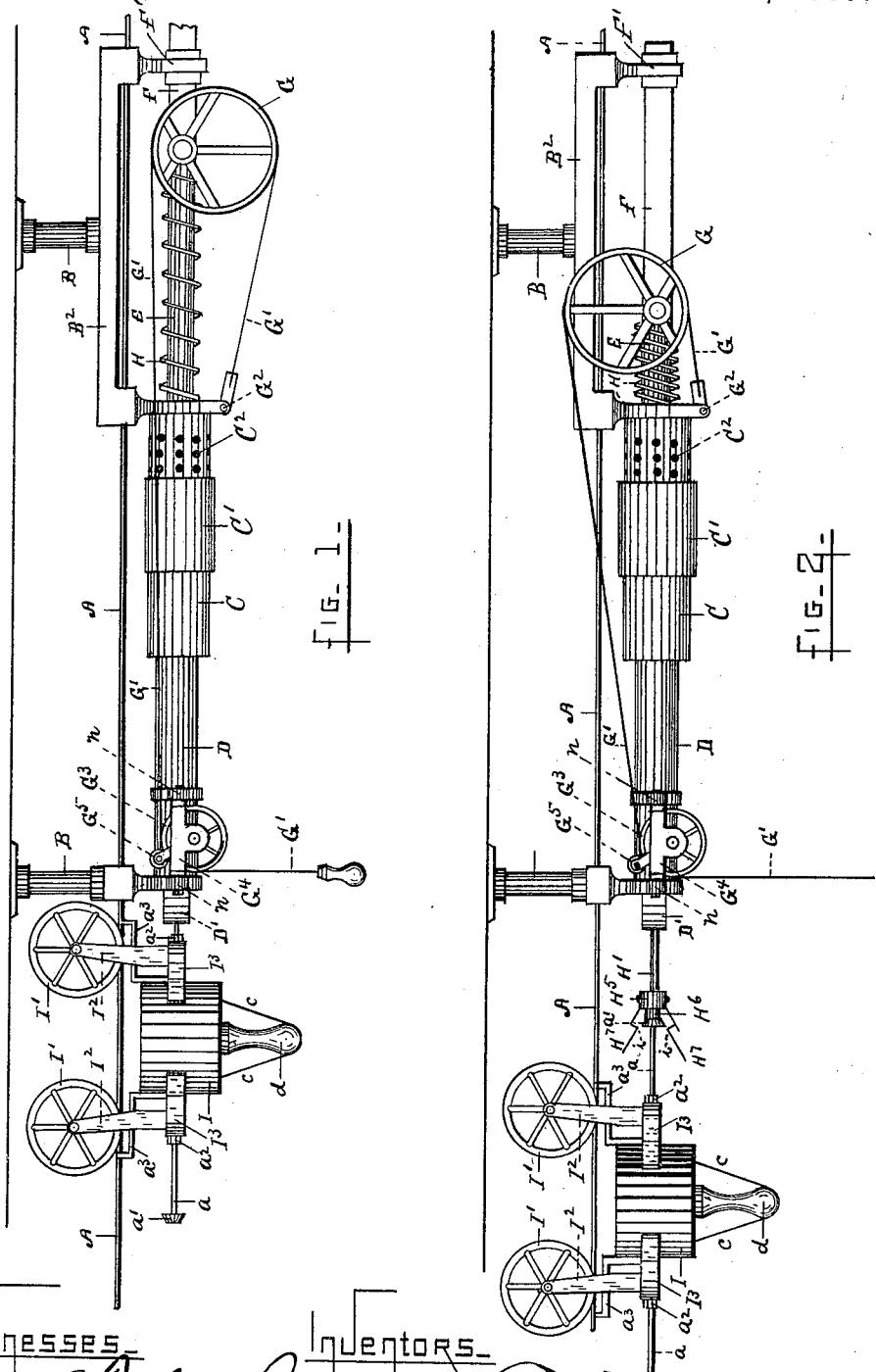

(No Model.) 4 Sheets—Sheet 3.

J. W. FLAGG & C. R. B. CLAFLIN, Jr.
CASH CARRIER.

No. 360,008. Patented Mar. 29, 1887.

Witnesses.
Rufus B. Fowler
H. M. Fowler

Inventors.
Joseph Watter Flagg
C. R. B. Claflin Jr.

N. PETERS, Photo-Lithographer, Washington, D. C.

(No Model.) 4 Sheets—Sheet 4.

J. W. FLAGG & C. R. B. CLAFLIN, Jr.
CASH CARRIER.

No. 360,008. Patented Mar. 29, 1887.

Witnesses
Rufus B. Fowler
H. M. Fowler

Inventors
Joseph Watter Flagg
C. R. B. Claflin Jr.

UNITED STATES PATENT OFFICE.

JOSEPH WALTER FLAGG AND CHARLES R. B. CLAFLIN, JR., OF WORCESTER, MASSACHUSETTS; SAID CLAFLIN ASSIGNOR TO SAID FLAGG.

CASH-CARRIER.

SPECIFICATION forming part of Letters Patent No. 360,008, dated March 29, 1887.

Application filed July 15, 1886. Serial No. 208,074. (No model.)

*To all whom it may concern:*

Be it known that we, JOSEPH WALTER FLAGG and CHARLES R. B. CLAFLIN, Jr., citizens of the United States, residing at Worcester, in the county of Worcester and State of Massachusetts, have invented a new and useful Cash-Carrier, of which the following is a specification.

Our invention relates to those cash-carrying systems in which a cash-holding receptacle or carriage is transmitted along a suitable way from the salesmen to the cashier and returned; and our invention consists in providing means by which the carriage is engaged and retained in position at each end of the way; in mechanism for releasing the carriage from the retaining devices; in applying the elastic energy of a body of compressed air to the carriage, by which it is given an impetus along the way, and in certain details of construction and arrangement, as hereinafter described, and specifically set forth in the claims.

The several objects of our invention are attained by means of the mechanism illustrated in the accompanying drawings, in which—

Figure 10:
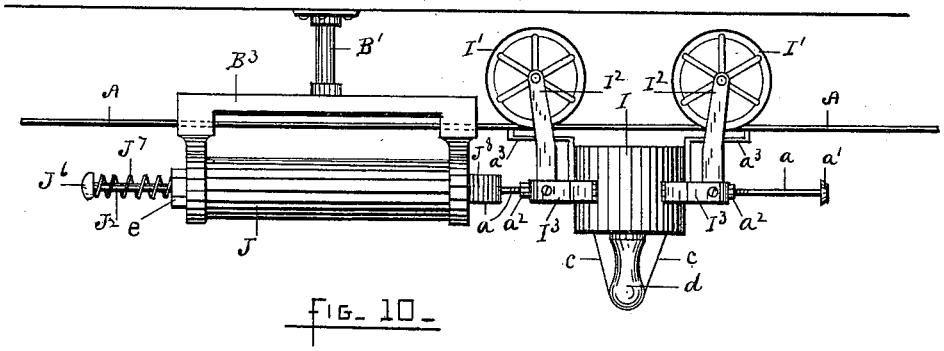
Figure 11:
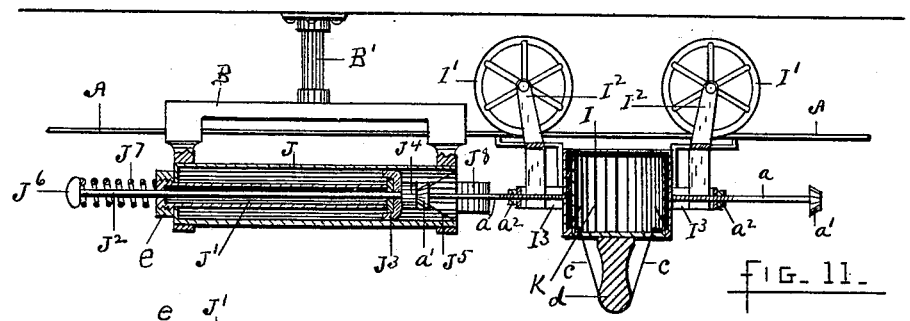
Figures 12, 13:
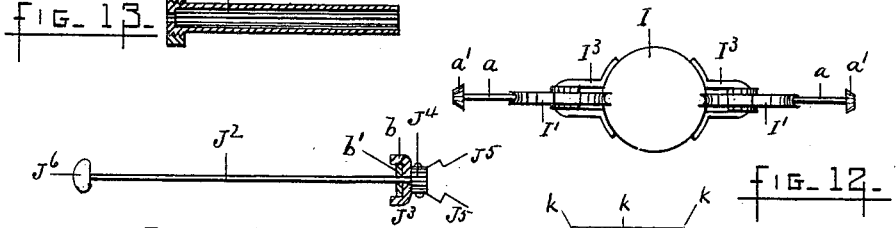
Figures 14, 15, 16, 17:
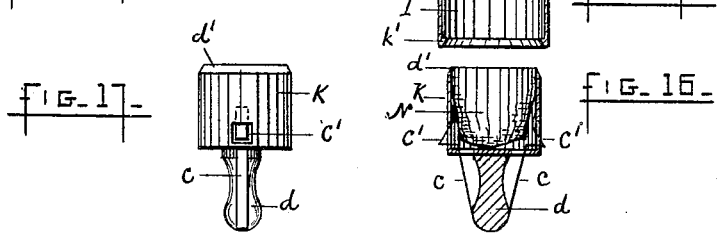
Figure 18:
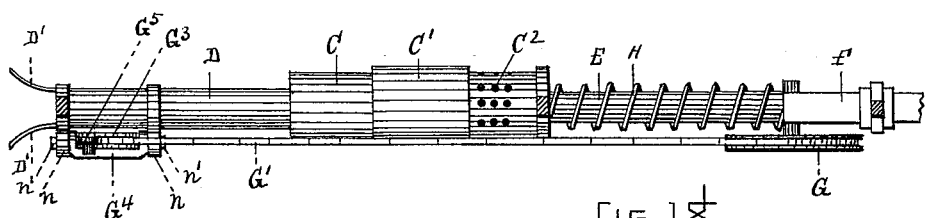
Figure 19:
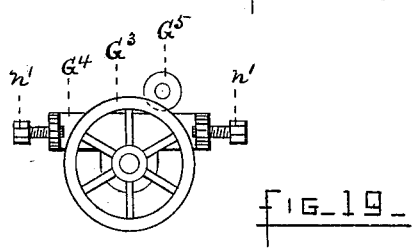
Figure 20:
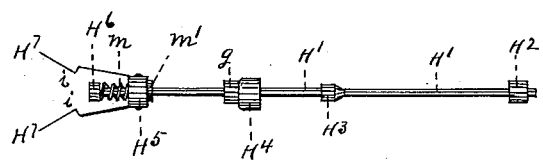
Figure 21:
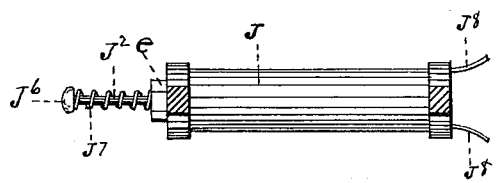

Figure 1 represents a front view of the mechanism employed to impart the initial velocity to the carriage. Fig. 2 shows the same view, but with the operating parts in the position assumed when the impetus has been given to the carriage. Fig. 3 shows the same in longitudinal sectional view. Fig. 4 is a detached view of the piston and hollow piston-rod for compressing the air. Fig. 5 shows a detached view of the rod to which the energy of the compressed air is imparted. Fig. 6 shows a transverse sectional view of the tube C, and exhibiting the latch for holding the rod H'. Fig. 7 represents the same, but with the latch in the position when the rod H' is released. Fig. $6^a$ represents a portion of the air-holding tube. Fig. 8 shows a sectional view of a part of the hollow piston-rod. Fig. 9 represents in section the piston on the rod H'. Fig. 10 is a front elevation of the mechanism for checking the velocity of the carriage and locking it in position at one end of the track or way, with a view of the carriage. Fig. 11 is a longitudinal sectional view of the same. Fig. 12 is a top view of the carriage. Fig. 13 is a sectional view of the sliding tube J'. Fig. 14 is a detached view of the sliding rod $J^2$. Fig. 15 shows a sectional view of the cylindrical part of the carriage. Fig. 16 is a sectional view of the cash-holding cup. Fig. 17 shows the cash-holding cup removed from the carriage. Fig. 18 represents a top view of the mechanism for imparting an initial velocity to the carriage, the wire upon which the carriage runs and a part of the supporting-frame being removed. Fig. 19 shows the method of supporting the swiveled pulley $G^3$. Fig. 20 is a view of the rod H', also shown in Fig. 5, but with a modified construction of the device for locking the carriage in position; and Fig. 21 is a top view of the mechanism for checking the velocity of the carriage, a portion of the supporting-frame being removed, like letters indicating like parts in the several views.

A A denote a portion of a wire attached at its ends (not shown) and drawn tight, leading from the sales-station in the store to the cashier's desk. We deem it preferable to give the wire A a slight inclination, the end at the cashier's desk being the highest.

B B are rods depending from the ceiling, to support the carriage-actuating mechanism shown in Figs. 1 and 2 and in sectional view in Fig. 3, and which consists of the air-holding tube C D, made in two sections of equal length but of unequal diameter, the section C being the larger and having a piston, $E^2$, (shown in section in Fig. 8,) and formed of a leather disk, $E^2$, held between the collars $f'$ and $f^2$, attached to the piston-rod. The piston-rod is hollow and cylindrical for a portion of its length, as at E, Fig. 4, and square for the remaining part, as at F. The round section of the rod screws into a sleeve at its end, which terminates in a conical tip, E', with a concentric hole to receive the rod H', whose end is screw-threaded at $f$ and carries a nut, $H^2$.

A pin, $F^2$, on the piston-rod carries the eccentric pulley G, and also serves as a stop for the spiral spring H, which is placed between it and the closed end of the tube C. A metallic diaphragm, $C^3$, separating the larger tube, C, from the tube D, has a series of holes, $h^2$, Figs. 6 and 7, and a central opening large enough to allow the collar $H^3$ on the rod H' to pass. To the diaphragm we attach a curved plate, $h^3$, pivoted on the screw $h^4$, and adapted to be pressed down upon the rod H' by the tension of the spring $h'$ acting upon the arm $h$, projecting from the face of the latch-plate $h^3$. A piston, $H^4$, (shown in section in Fig. 9, and formed of the leather disk $H^4$ and the collars $g\ g^2$,) is placed upon the rod $H^2$, fitting the bore of the smaller tube, D. At the end of the rod H', opposite the nut $H^2$, we attach a collar, $H^5$, to which we fasten the blade-springs $H^7$, each of which is bent at $i\ i$ to form an angle, in order to engage the carriage, and between the blade-springs and against the collar $H^5$ we place a piece of cork or other elastic substance, $H^6$.

The piston-rod E F is supported at one end by the tube C, and at its outer end by a bearing, F', which is held by the horizontal bar $B^2$, supported by the rod B. To the framework, at $G^2$, we pivot a cord or flexible metallic band, G', which is carried over the eccentric pulley G, thence over the guide-pulley $G^3$, and terminating in a handle at the end, by which it is conveniently drawn down.

The guide-pulley $G^3$ is pivoted to a yoke, $G^4$, which is pivoted by the screws $n'$, held in lugs $n$, so the yoke $G^4$ will be capable of a rocking motion on the pivotal screws $n'$. From the yoke $G^4$ an arm extends upward, carrying the small roll $G^5$, whose face runs within the groove in the face of the guide-pulley $G^3$, allowing the band G' to pass freely between the guide-pulley $G^3$ and the small pulley $G^5$, thereby retaining the band within the groove in the pulley $G^3$. At the end of the smaller tube, D, we place the curved guide-plates D', in order to cause one of the projecting arms of the carriage to enter the tube. Between the diaphragm $C^3$, separating the two tubes, and the piston $H^4$, we place a spiral spring, $H^8$, which holds the collar $H^3$ firmly against the latch-plate $h^3$.

In Fig. 20 we have shown a modified form of the latching device for retaining the carriage in position, in which the collar $H^5$, instead of being fastened to the rod H', is capable of sliding on it, and a spiral spring, $m$, between the collar $H^5$ and the elastic block $H^6$, holds the collar $H^5$ against a collar, $m'$, which is attached to the shaft H'.

The carriage consists of a cylinder, I, supported by the truck-wheels I', and the frame $I^2$ and $I^3$. The cylinder I is closed at the top and open at the lower end to receive the cup-shaped cash-holder K, which has a handle, $d$, attached to its lower end, and springs $c\ c$, fastened to the handle $d$, with catches $c'\ c'$, projecting through openings in the side of the cash-holder. The upper edge, $d'$, of the cash-holder is chamfered, and a flexible bag, N, is attached to the upper edge of the cash-holder, forming a loose lining to receive the cash and prevent it from coming in contact with the metallic surface of the holder, or from entering the openings formed to receive the catches $c'$.

Within the cylinder I and attached to its sides are placed springs $k$, with their free ends extending inward toward the center of the cylinder, and in position to bear against the chamfered edge of the cash-holder K and hold it concentrically within the inclosing-cylinder I. Around the lower edge of the cylinder I we form a shoulder, $k'$, which is engaged by the spring-catches $c'$, to retain the cash-holder K in the cylinder I. Bars $a^3$, attached to the cylinder I, project upward, with their free ends brought near the wire A, so that any upward thrust upon the carriage will be received by the wire A and prevent the truck-wheels from being lifted from the track.

Screw-threaded rods $a$ are screwed through the curved portion of the frame $I^3$, with their ends entering a short distance into the cylinder I, and having a check-nut, $a^2$, screwed firmly against the frame.

The rods $a$ are placed on opposite sides of the cylinder, parallel with the wire A and coincident with the axial line of the tube D, and to the outer ends of the rods $a$ are attached the frustum-shaped blocks $a'$, adapted to be engaged by the spring-catches $H^7$, as shown in Fig. 3. At the end of the way opposite the air-compressing mechanism, above described, we place the device shown in Figs. 10 and 11, for the purpose of checking the velocity of the carriage and retaining it in place at the cashier's desk, consisting of the tube J, supported by the frame $B^3$ and the rod B' from the ceiling. The tube J is open at one end and contains a pipe, J', Fig. 13, open at its inner end and closed at its outer end, and capable of sliding through the closed end of the tube J. The outer end of the pipe J' carries a nut or collar, $e$, which limits its motion in one direction. Through the closed end of the pipe J' we pass a sliding rod, $J^2$, having a piston, $J^3$, and collar $J^4$, to which are attached the bent blade-springs $J^5$, adapted, like the blade-springs $H^7$, to engage the blocks $a'$ of the carriage.

At the outer end of the rod $J^2$ is a hand-knob, $J^6$, and between the knob $J^6$ and the outer end of the pipe J' we place a spiral spring, $J^7$, whose tension is applied to hold the piston $J^3$ against the open end of the pipe J'. Curved guide-plates $J^8$ are attached to the open end of the tube J, in order to insure the entrance of the forward arm, $a$, and block $a'$ of the carriage.

Both the air-compressing mechanism and the receiving device are hung beneath and parallel with the wire A, and with their axial lines coincident with each other and with the arms $a\ a$ of the carriage.

The cash to be transmitted is placed in the cup-shaped holder K, which is withdrawn from the cylinder by compressing the blade-springs $c\ c$ as the handle $d$ is seized by the salesman and the spring-catches withdrawn from the shoulder $k'$. By pushing the cash-holder K into the cylinder the catches $c'\ c'$ are pressed in by the shoulder $k'$, automatically locking the cash-holder in the cylinder I.

The operation of transmitting the carriage over the way from its position, as shown in Fig. 1, to the cashier's desk and back again is as follows: The salesman, by pulling down upon the cord or band G', will cause the eccentric pulley G to rotate and the piston-rod E F, with its piston H², to be carried along the larger tube, C, compressing the spring H and forcing the air from the tube C through the holes $h^2$ into the smaller tube, D, compressing it into the space behind the piston H⁴. As the conical tip E' approaches the separating-diaphragm the tip E' is brought beneath the projecting arm $h$, thereby lifting the latch-plate $h^3$ and releasing the rod H', which is carried outward by the elastic force of the air which has been compressed behind the piston H⁴, giving an impetus to the carriage sufficient to carry it over the upwardly-inclined track to the cashier's desk, and bringing the operating parts of the air-compressing mechanism into the position shown in Fig. 2. When the carriage arrives at the cashier's desk, the forward arm, $a$, of the carriage, with its block $a'$, enters the open end of the tube J, pressing apart the springs J⁵ and striking against the collar J⁴, carrying the rod J², tube J', and piston J³ into the tube, thereby compressing the air contained therein, which acts as a cushion to gradually check the motion of the carriage. When the carriage is to be returned, the rod J² is pressed in by the knob J⁶, carrying the pipe J' into the tube, the continued motion of the rod J² compressing the spring J⁷ and carrying the blade-springs J⁵ out of the tube J. The springs J⁵, as well as the springs H⁷, when released from their respective tubes, open by their own elasticity, thereby releasing the blocks $a'$ and allowing the carriage to move along the way. When the salesman releases the cord or band G', after sending the carriage to the cashier's desk, as described, the tension of the spring H will reverse the motion of the piston-rod E F, drawing the rod H' back to its normal position by means of the nut H². As the carriage returns to the sales-station the forward arm, $a$, of the carriage will enter the open end of the tube D, its attached block $a'$ opening the springs H⁷, striking the elastic block H⁶, and compressing the spring H⁸ and spring $m$, and entering past the catches $i\ i$. The tension of the spring H⁸ will then return the rod H' to its normal position, as shown in Fig. 3. In case a vibratory motion should be given to the carriage, causing it to rock or swing laterally upon the wire, the curved guide-plates D' and J⁸ will cause the advancing arm of the carriage to enter the tubes at the end of the way.

We vary the force by which the car is propelled by means of a series of small holes, C², in the tube C, and a sliding sleeve, C', which is kept in any desired position by its friction on the tube C. (Shown in Figs. 1 and 6ᵃ.) As the piston E² advances, the air, instead of being driven forward into the small tube D, escapes through the holes C² until the piston reaches the sleeve C'. The holes C² are arranged in parallel rows around the tube C, so the sleeve C' may be moved over one or more rows of holes, thus varying the amount of air which will be compressed in the small tube D.

So far as our invention relates to the application of the elastic energy of a body of compressed air for the purpose of imparting an initial impetus to a cash-carrying receptacle, in combination with such a cash-carrying receptacle and a track or way on which it is adapted to run, we do not confine ourselves to the specific construction of the air-compressing mechanism as shown, nor to the use of tubes of unequal capacities; but we deem the construction shown to be preferable in many respects for the accomplishment of the objects sought.

What we claim as our invention, and desire to secure by Letters Patent, is—

1. The combination, with a way and a cash-carriage adapted to run thereon, of mechanism for imparting an initial impetus to said cash-carriage, and consisting, in its essential features, of a chamber in which air is compressed, a piston locked in position in said chamber, with its piston-rod in contact with the cash-carriage, and an air-compressing piston sliding in said chamber, by which air is compressed against the piston, impelling the cash-carriage, with disengaging devices, by which the carriage-impelling piston is released, substantially as described.

2. The combination, with a way and a cash-carriage adapted to run thereon, of a tube parallel with said way and having one end closed, a piston locked in position in said tube, with its rod in contact with said cash-carriage, the space between said piston and the closed end of the tube forming a pressure-chamber, said piston having disengaging devices, by which it is released, substantially as described.

3. The combination, with a way and a cash-carriage adapted to run thereon, of a tube formed in two sections of different diameters, a piston locked in position in the smaller section, with its rod in contact with the cash-carriage, a piston moving in the larger section, whereby the air is compressed between the two pistons, and disengaging devices, by which the piston in the smaller section is released, substantially as described.

4. The combination, with a tube in which air is compressed, and a piston moving in said tube to effect the compression of the air therein, of an eccentric pivoted to the rod on said piston, a cord or band having one end held rigidly and passing over said eccentric, whereby the piston is moved along said tube by drawing upon the free end of said band or cord, and a spring whose tension is applied to reverse the motion of said piston.

5. The combination of tubes C and D, a diaphragm with holes $h^2$, separating the tubes, piston E², hollow rod E, piston H⁴, and rod H', entering said hollow rod, collar H⁵, and spring H⁸, substantially as described.

6. The combination, with a tube and a piston for compressing air therein, of a piston moved in said tube by the force of the compressed air, and a latching device for holding and releasing said piston, and consisting of a collar, $H^3$, on the rod of the piston, a pivoted plate, $h^3$, and a spring applied to said pivoted plate to hold it in engagement with the collar on the piston-rod.

7. The combination of the tubes C D, pistons $E^2$ and $H^4$, with the collar $H^3$, plate $h^3$, spring $h'$, arm $h$, and cone $E'$.

8. The combination, with a tube and a piston sliding in said tube, of a collar attached to the piston-rod, and bent blade-springs attached to said collar, so as to be compressed and made to engage the cash-carriage when they are withdrawn into said tube.

9. The combination, with a tube, a rod sliding in said tube, a collar, $H^5$, sliding on the rod, a collar, $m'$, and an elastic cushion, $H^6$, of spring $m$, blade-springs $H^7$, and catches $i\ i$.

10. The combination, with a pressure-chamber, an air-compressing piston, and a pull-cord connected with said piston, of a grooved guide-pulley, a retaining-pulley running in the grooved face of the guide-pulley, and a yoke carrying said guide and retaining-pulleys, said yoke being pivoted in lugs with its axis above the axis of the guide-pulley and at right angles thereto, as and for the purpose set forth.

11. The combination, with a way, of a cash-carriage having truck-wheels adapted to run on said way, and provided with a shell or case, suspended from said truck-wheels, a cup-shaped cash-holder held in the shell or case, and having a handle, $d$, and springs $c\ c$, attached to said handle, and entering the bottom of the cash-holder and engaging the shell or case, substantially as described.

12. The combination, with a way and a carriage adapted to run thereon, and provided with a cylindrical shell or case, and a cup-shaped cash-holder held in said shell or case, of the springs $k$, arranged on the inside of the shell or case and bearing against the top of the cash-holder, as and for the purpose set forth.

13. The combination, with a way and a cash-carriage adapted to run on said way, of mechanism for checking the velocity of the carriage, and consisting, in its essential features, of a tube closed at one end, a piston sliding in said tube and receiving the impact of the carriage through the open end of the tube, and having a piston-rod passing through the closed end of the tube, and provided with a handle, by which the motion of the piston is reversed after it has been moved inward by the impact of the carriage, as described.

14. The combination, with the way of a cash-carrying system and a cash-carriage adapted to run thereon, of a tube, J, a piston-rod, $J^2$, a piston, $J^3$, a pipe, $J'$, inclosing the piston-rod and having a nut, $e$, and spring $J^7$, all operating as set forth.

15. The combination, with the way of a cash-carrying system and a cash-carriage adapted to run thereon, of the tube J, piston $J^3$, collar $J^4$, spring $J^5$, piston-rod $J^2$, spring $J^7$, and pipe $J'$, having a nut, $e$.

16. In mechanism for imparting an initial velocity to the cash-carriage of a cash-carrying system, the combination, with a tube having a series of holes to allow the escape of air, and a piston sliding in said tube, of an adjustable sleeve inclosing said tube, whereby the number of holes is varied, the amount of air being thereby increased or diminished.

JOSEPH WALTER FLAGG.
C. R. B. CLAFLIN, JR.

Witnesses:
RUFUS B. FOWLER,
H. M. FOWLER.